(12) United States Patent
Lauridsen et al.

(10) Patent No.: US 7,796,973 B2
(45) Date of Patent: Sep. 14, 2010

(54) METHOD TO CHALLENGE CELL PHONE USER FOR FRAUDULENT USE

(75) Inventors: Christina Karen Lauridsen, Austin, TX (US); Hypatia Rojas, Round Rock, TX (US); Elena Schneider, Austin, TX (US); Robert Kevin Sloan, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 11/968,539

(22) Filed: Jan. 2, 2008

(65) Prior Publication Data

US 2008/0102791 A1  May 1, 2008

Related U.S. Application Data

(63) Continuation of application No. 11/157,538, filed on Jun. 21, 2005, now Pat. No. 7,373,137.

(51) Int. Cl.
*H04Q 7/20* (2006.01)

(52) U.S. Cl. ........................ 455/410; 455/411; 455/565; 455/564; 455/550.1; 455/422.1; 379/199; 379/200; 379/207.14; 379/210.02; 379/216.01

(58) Field of Classification Search .................. 455/410, 455/411, 565, 564, 550.1, 422.1, 403, 414.1; 379/199, 200, 207.14, 210.02, 216.01
See application file for complete search history.

(56) References Cited

U.S. PATENT DOCUMENTS

| 5,884,193 | A | * | 3/1999 | Kaplan | 455/565 |
| 2002/0165012 | A1 | * | 11/2002 | Kirbas et al. | 455/565 |
| 2004/0208304 | A1 | | 10/2004 | Miller | |
| 2006/0089120 | A1 | * | 4/2006 | Luo et al. | 455/410 |

* cited by examiner

*Primary Examiner*—Keith T Ferguson
(74) *Attorney, Agent, or Firm*—Cynthia G. Seal; Law Office of Jim Boice

(57) ABSTRACT

A method and system for monitoring calls being made from a cellular phone and preventing calls being made to unauthorized numbers, as defined by the owner of the cellular phone. A security challenge is issued to a cell phone user when a suspicious, previously unknown telephone number is attempted to be called. Approved/safe numbers and/or area codes are stored within the phone and/or in a subscriber's account accessible and updated via the Internet. If the user is unable to provide the correct security code in response to the challenge, the user is prevented from making the call to the particular number.

12 Claims, 7 Drawing Sheets

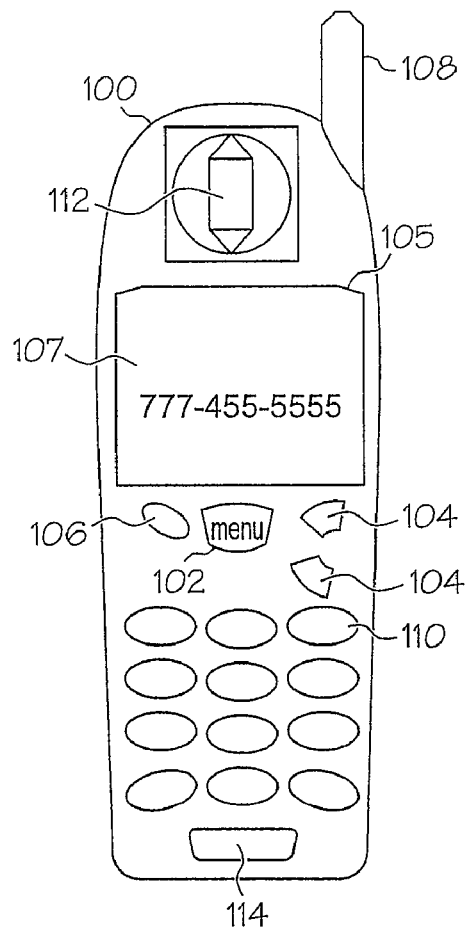
FIG. 1A
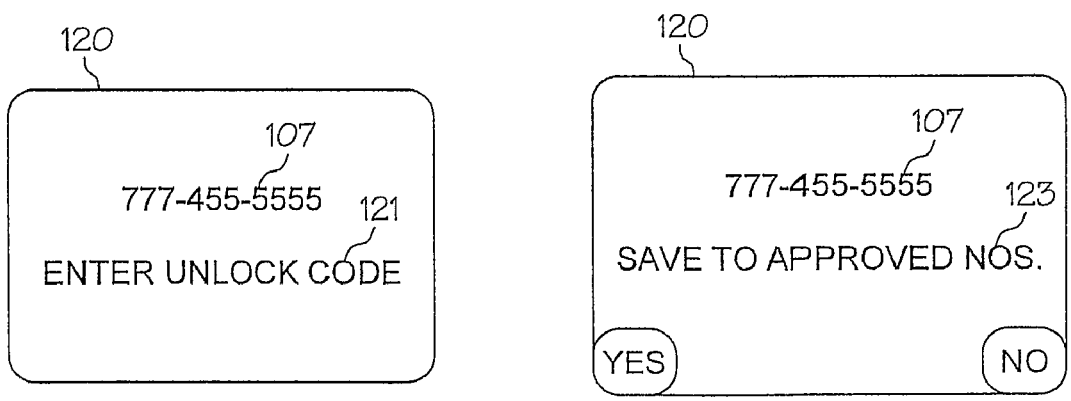
FIG. 1B
FIG. 1C

METHOD TO CHALLENGE CELL PHONE USER FOR FRAUDULENT USE

PRIORITY CLAIM

The present application is a continuation of U.S. patent application Ser. No. 11/157,538, now U.S. Pat. No. 7,373,137 entitled "Method to Challenge Cell Phone User for Fraudulent Use," filed on Jun. 21, 2005.

BACKGROUND OF THE INVENTION

1. Technical Field

The present invention relates generally to wireless communication and in particular to wireless communication devices. Still more particularly, the present invention relates to a method, system, and device for reducing unauthorized use of a wireless communication device.

2. Description of the Related Art

Wireless communication has experienced very rapid growth in recent years and that growth continues to increase as demand for wireless service expands. In some developed countries, telephone communication via handheld wireless devices (e.g., cellular phones or cell phones) is catching up to and may eventually surpass conventional communication via landline (public switched telephone networked (PSTN)) phones. The portability of these handheld phones along with the expansion of services/features provided by the phones are among the driving forces behind this increase proliferation and utilization of cellular phones.

While portability of the cell phones makes them more attractive as a personal/business communication device, their portability, along with other factors, makes cellular phones easy targets for thieves. Thus, as improving technology results in smaller phones with more expansive features and thus higher cost, cellular phone theft is also increasing. When theft of the cell phone occurs, the owner (who typically subscribes to a particular calling plan with a service provider) would like to be able to protect himself/herself from having the thief make unauthorized calls on the device that may ultimately result in very high costs to the subscriber. For example, these unauthorized calls may include calls to international numbers or calls outside a local calling zone that are charged at a premium to the subscriber.

It is not uncommon for unscrupulous people to "borrow" and/or "use" another person's cellular phone without the owner's permission/authorization. The owner may feel comfortable leaving the cell phone out in an area that is accessible by the other people (family or co-workers) and later find out that a call was made to a number outside of his local calling zone, resulting in an unexpected charge to the owner. For those persons with geographic calling zones, for example, a call outside of the geographic zone is billed per minute to the user. While the user elects to not make such calls from his cell phone, a "borrower" may not be aware of the restriction or may not care enough to refrain from utilizing the cell phone to call outside the calling zone. International calls also fall into this category of (outside the calling zone) calls for users with nationwide calling plans. The subscriber/owner of the cell phone would like to prevent both thieves and "borrowers" alike from being able to place such calls using the subscriber's cellular phone.

Conventional methods of securing a cellular phone from fraudulent or unauthorized use typically involves some sort of internal locking mechanism that requires a user password to unlock the cell phone for use. Thus, many cell phones today have a locking mechanism that will lock down the outbound dialing capabilities of the phone as well as secure personal items on the phone, such as phone list, etc. How the locking feature is implemented varies across models; however, the basic operations tend to include a user choice of (1) manually locking immediately, (2) locking the phone only at power on, and (3) locking the phone when idle. To unlock the phone, the user has to enter a pre-established secret code.

To accommodate this locking function, the cellular telephone provides a dial lock function for disabling key input except for entry of a personal identification number (terminal identification number). This prevents unauthorized use by others when the phone is stolen or lost or borrowed. This feature also prevents/avoids erroneous key input when the phone is carried in a pocket or stored in a bag.

In such cell phones, the dial lock function becomes active by depressing a set combination of keys or by selecting the dial lock function from among an operation menu or by setting the menu to instantly disable key input except for entry of the identification number. When the user later inputs the identification number while the key input is disabled, the entry of the identification number releases the dial lock function to enable key input.

While the dial lock feature provides some security, most subscribers do not utilize this feature because it is cumbersome to unlock the phone all the time and the user may not remember to lock the phone after each use. Even when an automatic lock function is programmed on the phone, many cell phones are stolen and calls are made before the automatic lock enables on the cell phone.

Other security features have been suggested by various publications/patents. Among these are the following, which are presented along with their primary limitation as relevant to the latter description of the current invention.

PCT application, PCT/CA98/00572, describes a system and method for challenging a cell phone user to enter a security code when a number is entered on the phone that does not match one of a list of potential terminating numbers that are stored as entries in a database that is located on a switch or network connected to the switch. Looked at from another perspective, Patent PCT/CA98/00572 describes a database containing ranges of numbers that are either set by the user in advance, or added to the database individually upon authorization when the user attempts to place an outgoing call.

U.S. Patent Application No. 2002/0165012 describes a system and method for allowing or restricting wireless communication based on a predefined set of area codes and geographic position locations. Depending on which area codes are stored, calls made to the restricted area codes are not connected and/or calls made to the permitted area codes are connected.

U.S. Pat. No. 6,035,217 provides a single button wireless communication device that allows a user to place calls by speaking the destination number or associated word. The user verbalizes a name to connect to the phone number associated with the spoken name. The user may have to verbalize a security code or PIN before the name/phone number before the communication is allowed.

Despite these methods for providing security against unauthorized use, the present invention recognizes that limitations exist with each method, and the invention provides a different security method that is superior to each of the above described methods.

SUMMARY OF THE INVENTION

Disclosed is a communication device that supports implementation of a method and system for selectively challenging users of the device for entry of a security code in order to prevent calls being made to unauthorized numbers. A security challenge is issued to a cell phone user when the user attempts to initiate a call to a number that is not among a list of authorized numbers preset by the owner of the cell phone. If the user is unable to provide the correct security code in response to the challenge, the user is prevented from using the cell phone to make the call to that particular number.

In one embodiment, failure of the user to be able to authenticate the phone (by providing the security code when prompted) locks the entire outgoing functions of the phone. In a related embodiment, the phone is automatically locked to all dialing/calling following a predetermined number of consecutive failures to authenticate numbers being called.

The cell phone is programmed/designed to keep a list of previous numbers dialed in addition to the owner's/subscriber's personal telephone directory. The owner/subscriber is made to establish a security code during initial set up of the phone, and the security code remains in persistent storage within the phone. The owner is also prompted to select a security setting from among:

(1) challenge the user when a number is being dialed that is not in the list of previously dialed numbers;
(2) challenge the user when an area code is being called that is not been previously authorized;
(3) challenge the user when a number that isn't in the user's dialing directory is being called;
(4) challenge the user when a number is being dialed that hasn't previously shown up in the caller ID; and
(5) challenge the user when a number being dialed in on a list of blocked numbers.

These selections may be provided by a dialed number-based security (DNBS) utility which displays the list of available/selectable options via the display of the cell phone. The user selections are stored and user input of all numbers is monitored by the DNBS utility. In one embodiment, multiple of the above selections are simultaneously activated so that challenges are issued when any one of the multiple activated/monitored conditions is encountered. In one embodiment, rather than challenge the user on every unknown number, an additional setting of the DNBS utility only challenges the user if the entered area code is not in the approved list or if the cellular phone has been idle for a user-selected amount of time.

While most of the users' general phone directory is entered directly on the cellular device, one feature of the invention enables the user to configure particular numbers/area code that may be dialed without DNDS prompting the user to enter the security code. The user completes the entry of these specific "safe" or "approved" numbers through the telephone's LCD/keypad interface or through a secure web portal accessible through a standard web browser. With the latter method, the user must enter a unique combination of user identification (ID) and password to access his/her subscriber account. Also, the user may require any changes to the setting to only occur through the secure web portal, as an additional security feature.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 1A is an exemplary cellular phone within which the various features of the invention may advantageously be implemented;

FIGS. 1B and 1C illustrate two representations of an LCD display of a cell phone with prompts generated by a security utility responding to entry of an unauthorized user-entered number, according to two embodiments of the present invention;

Figure 2A:
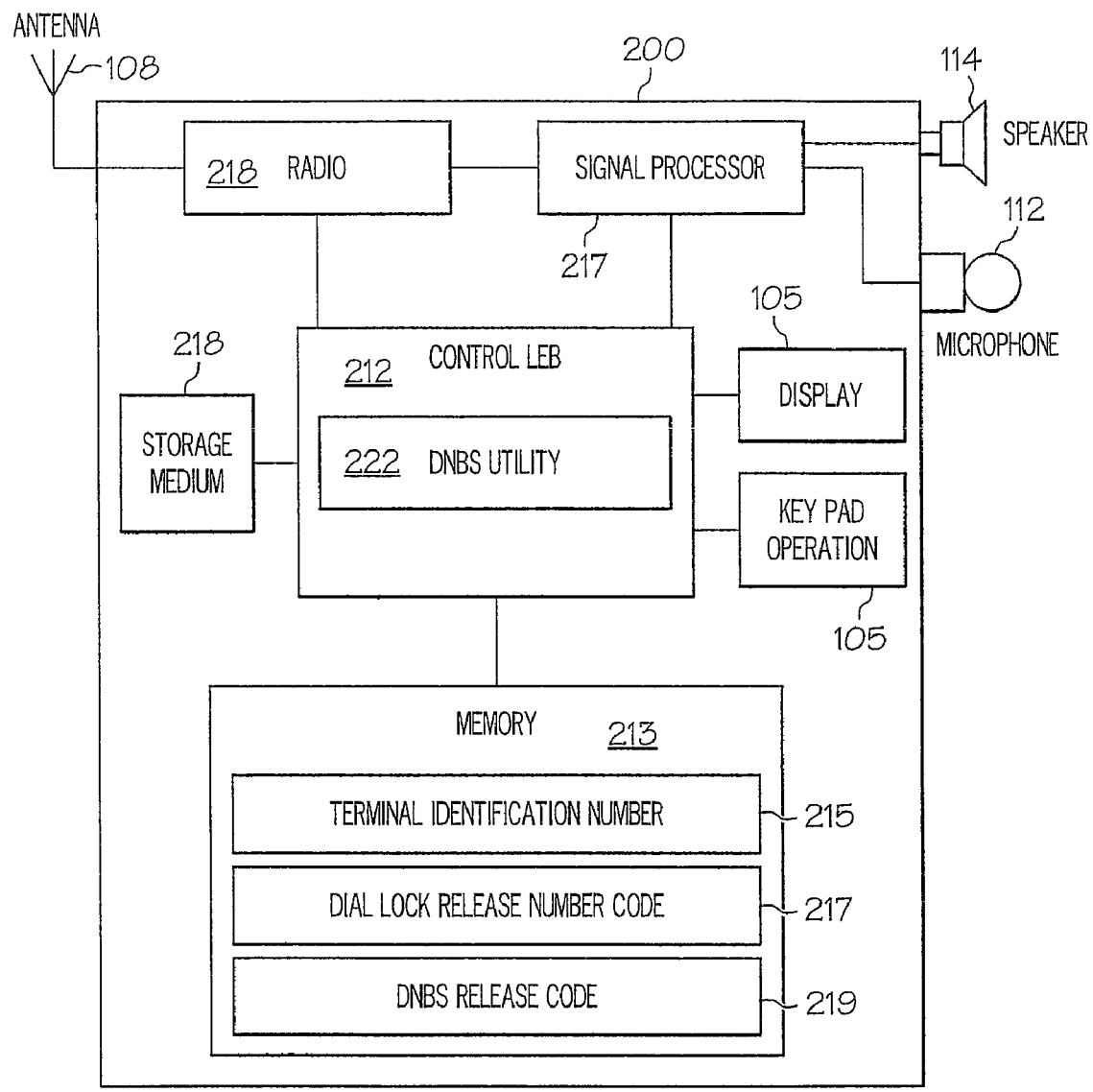
FIG. 2A is a block diagram representation of the internal components of the cellular phone according to one embodiment of the invention.

DETAILED DESCRIPTION OF AN
ILLUSTRATIVE EMBODIMENT

The present invention provides a communication device and a method implemented therein for selectively challenging users of the device for entry of a security code in order to prevent a communication/transmission being made to a unauthorized destination identification (ID). In the illustrative embodiments, the communication device is a cell phone and the communication is a phone call being made to a terminating phone number entered on the cell phone. A security challenge is issued to a cell phone user when the user attempts to initiate a call to a number that is not among a list of authorized numbers preset by the owner of the cell phone. If the user is unable to provide the correct security code in response to the challenge, the user is prevented from using the cell phone to make the call to that particular number.

While specifically described from the context of a cell phone, it is understood that the features of the invention are applicable to any communication device that requires entry of a destination ID to complete a communication. The use of a cell phone embodiment is therefore not meant to be limiting on the invention.

Turning now to the figures and in particular to FIG. 1, which illustrates an exemplary cell telephone within which the features of the invention may advantageously be implemented. Cell phone 100 (interchangeably referred to as a mobile device, cell phone, mobile terminal, or wireless device) includes display 105 (LCD screen, for example), a control panel with menu key 102, control/scroll/select keys 104 and power button 106, numeric keypad 110, speaker 112, microphone 114, and antenna 108. Notably, other buttons or keys are possible in alternate embodiments of the cellular phone, and the specific configuration/design of cell phone 100 is provided for illustrative purposes only and not intended to imply any structural or other limitations on the invention. For example, cell phone 100 may be of a "flip" design and include a top and bottom portions connected via a hinge mechanism.

Display 105, which is implemented by an LCD (liquid crystal display) for example, displays necessary information (functional status, the presence or absence of incoming calls, etc.) to the user. As illustrated, a user-entered number 107 is displayed on display 105, and other visual outputs are illustrated by FIGS. 1B and 1C, which are described below. The control panel receives control instructions (operation inputs) from the user via the various control buttons. Those skilled in the art are familiar with the basic operational qualities of the above described buttons and hardware components.

FIG. 2A is a block diagram illustrating an exemplary view of the internal connective circuit of key components of cell phone 100. Several of the components are represented in the external view of cellular phone 100 and have thus been described with respect to FIG. 1 and share similar number patterns with FIG. 1 (e.g., display 105, antenna 108, microphone 112, speaker 114). In addition to these externally-viewable components, cell phone 200 comprises internal components, including signal processor 217 and radio transceiver 218, controller (or microprocessor) 212, memory 213, and storage medium 218.

Antenna 108 transmits and receives radio waves (wireless signals) and the radio transceiver 217 performs processes relating to transmitting and receiving radio communication. Signal processor 217 converts received radio signals into audio signals outputted by the speaker 114 and coverts received audio signals from the microphone 112 into radio signals that are transmitted by the radio transceiver 216 and antenna 108 combination. Key pad 210 includes internal electrical sensors behind each key (110) visible from the exterior of cellular phone. These sensors trigger a particular response when the key is depressed by a user.

Controller 212 is a microprocessor that is the brain of cell phone 200. Controller 212 controls all processes occurring within/on cell phone 200, including responding to user-inputs and executing program modules to generate menu items, prompts, etc. that are outputted on the display 105. As described below, controller 212 executes a dialed number-based security (DNBS) software utility 222 that locks the radio transceiver from connecting a call to a particular number dialed when the number does not meet certain pre-established (user-defined/selected) criteria. Controller 212 also enables all other menu functions when the user depresses the menu button and other select buttons on cellular phone.

Memory 213 stores contents of various setting of the cellular phone, including the terminal identification number 215, dial lock release code 217, and DNBS release code 219. In one embodiment, a single user-established code is utilized as dial lock release code 217 and DNBS release code 219. Dial lock release code 217 enables a user to unlock a phone that is locked (i.e., disabled numeric keypad from recognizing input for dialing out), as described in the background section. DNBS utility 222 provides code executed by controller 212 to perform the various security functions of the invention, such as preventing completion of a call to an un-authorized number unless the user enters the security code.

Figure 2B:
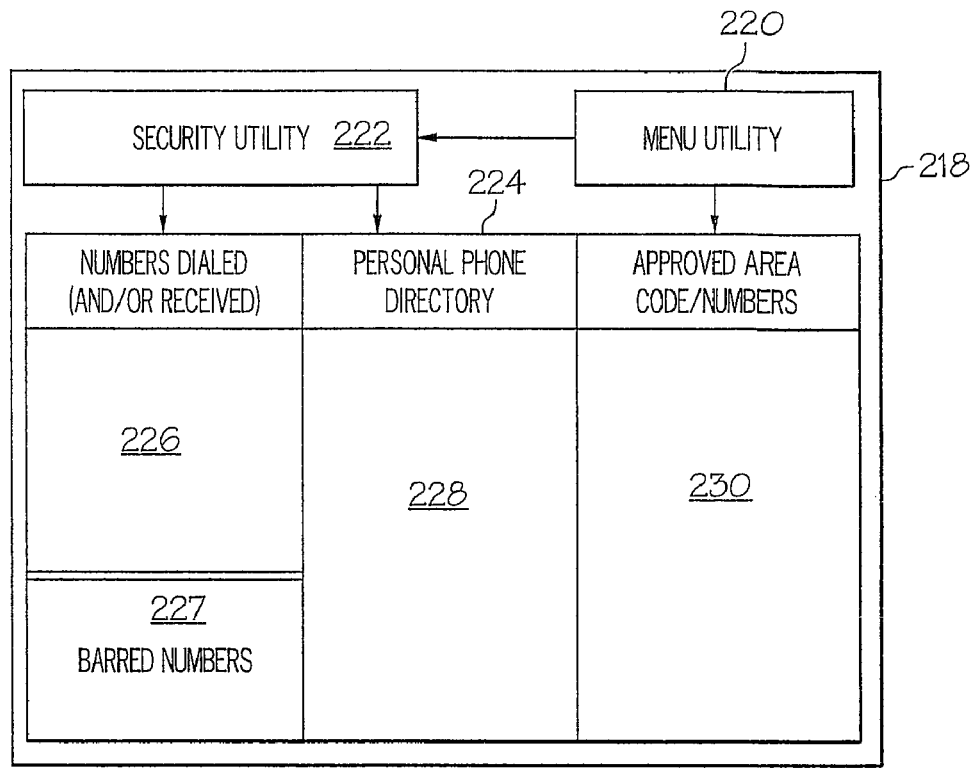
FIG. 2B is a block diagram representation of the software utility/modules and database within the storage medium of the cellular phone, according to one exemplary embodiment of the invention.

Storage medium 218 stores computer executable program as individual utilities/modules and maintains a database of user-entered (or dynamically created/stored) data. FIG. 2B illustrates in greater detail the utilities/modules and database stored within storage medium 218. Key utilities illustrated are menu utility 220 and security utility 222 (which may be DNBS utility 222, or a combination of DNBS utility and other security features, depending on implementation). Menu utility 220 provides all the features of a cell phone menu, displayed on display 205 when menu button and scroll/select buttons are depressed. Security utility 222 has been introduced above and the functions provided by security utility 222 are further described below. Controller 212 executes respective ones of the program modules/utilities to provide the operational features of the cellular phone 200.

Also illustrated within storage medium 218 is user database 224, which in the illustrative embodiment includes a numbers dialed list 226, barred numbers list 227, a personal phone directory 228, and an approved area code/numbers list 230. When a number is dialed, DNBS/Security utility 222 accesses particular ones of these lists of numbers to determine when a call to an entered phone number should be allowed without first requiring the user enter the DNBS release code 219.

Phone directory 228 is a standard directory maintained by most conventional cell phones. The user specifically enters the number and corresponding identifying information into the phone directory 228. One distinction between a personal phone directory 228 and an approved area code/numbers list 230 is that the approve list maintains only numbers while the phone directory 228 maintains additional identifying data associated with the saved number, such as name and type of number (mobile, home, work). Thus entry of a number within the approved list 230 may require the user select "Yes" in response to a prompt to save the number to the approved list 230.

Numbers dialed list 226 maintains a list of numbers dialed that are not in the personal phone directory 228. In one implementation, numbers are stored within this list only after the user first enters the DNBS release code 219 to enable an initial call to that number. Thus, numbers that are in the approved list 230 or the phone directory 228 are not stored within the numbers dialed list 226. Also, in another embodiment, numbers of received calls are stored within the numbers dialed list 226 or in a separate list for received call numbers. However, in one implementation that supports storage of numbers for incoming/received calls, the user has to first connect (answer) the call and then select "Yes" on termination of the incoming call when asked if to save the number to one of the lists. Specifically, the user may be first prompted to save the incoming (or dialed) number to the phone's personal phone directory 228. If the user selects not to, then the user may then be prompted to save the number in one of the other lists that allow direct dialing of the number without entry of the DNBS code (e.g., a received numbers list).

In another embodiment, a list of barred numbers 227 is maintained, which comprises numbers entered by the user that can not be called from the user's cell phone without entry of the DNBS code. The embodiment applies to specific numbers that the user does not want called by a thief or authorized borrow of the phone, such as 900 numbers, and specific local/international numbers (or area codes).

One embodiment of the present invention enables the user to configure particular numbers/area code that may be dialed without DNDS prompting the user to enter the security code. The user completes the entry of most numbers to the various lists directly through the telephone's LCD/keypad interface. In an alternative embodiment, the approved list(s) of safe numbers (or barred numbers) is entered by the user through a secure web portal accessible through a standard web browser connected to a networked server of the cellular service provider. As an additional security feature with this latter method, the user may require any changes to the setting (of approved/safe numbers) to only occur through the secure web portal.

Figure 3:
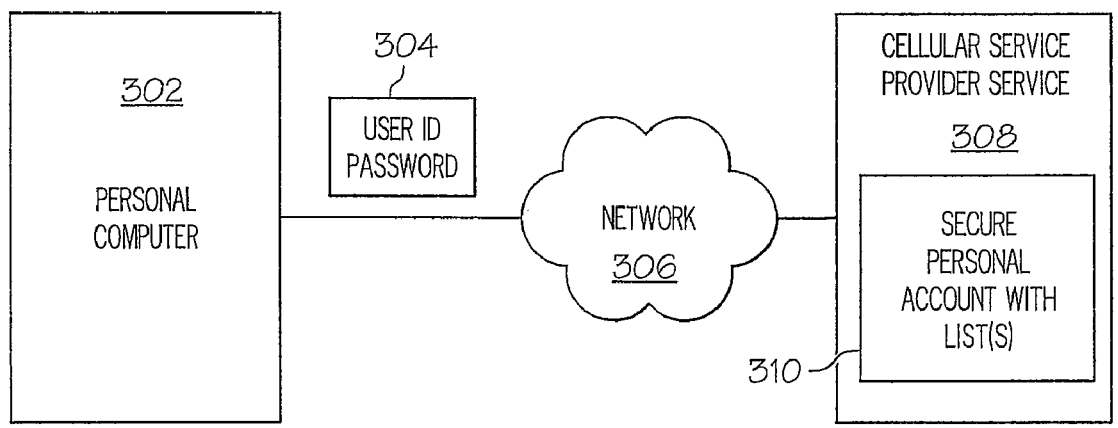
FIG. 3 illustrates an exemplary network access to a subscriber account according to one embodiment of the invention.

FIG. 3 illustrates an exemplary network configuration including a personal computer 302 connected to a service provider server 308 via a network 306, such as the Internet.

Within server 308 is a subscriber account 310 that maintains specific subscriber information. Access to the subscriber account 310 is secure and requires the user enter a unique combination of userID and password 304 via personal computer 302. According to one embodiment of the invention, subscriber information includes a list of approved numbers and/or area codes to which the subscriber's cellular telephone/mobile device is allowed to call without requiring entry of a DNBS code. In one implementation, one or more of the above described lists are maintained within the subscriber account and updated via the Internet.

Figure 5:
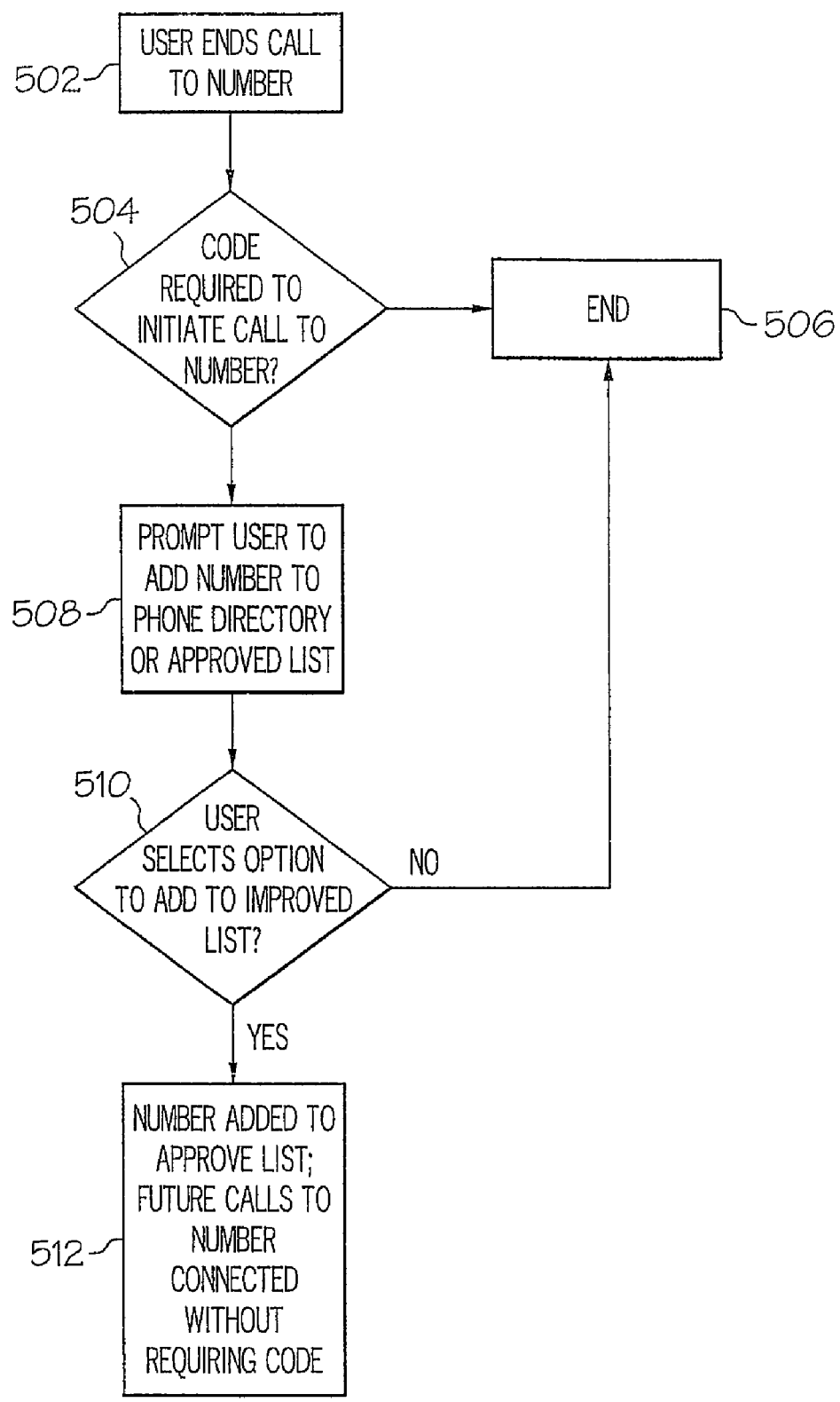
FIG. 5 is a flow chart of the process of prompting a user to enter a dialed number into an approved/safe list and updating that list according to one embodiment of the invention.

FIG. 5 illustrates the process of updating the list of approved/safe numbers following an outgoing call. The process begins at block 502 at which the user terminates a call to a phone number. DNBS utility determines at block 504 whether the DNBS code was required to complete the call, and if not, then the process ends. If the DNBS code was required, however, DNBS utility prompts the user to add the number to the phone directory or to the approved list, as shown at block 508. DNBS utility checks at block 510 whether the use selects the option of adding the number to the approve list. FIG. 1C illustrates display 122 of the cellular phone with an exemplary prompt 123 whether entered number 107 is to be saved to the approved list. If the user selects that option, the number is added to the approved list as indicated at block 512, and all future calls to that number are connected without requiring entry of the DNBS code. This selection may be required only when the user elects not to save the number to the phone directory.

Notably, in an alternate embodiment, all dialed numbers that are approved with a DNBS code are automatically placed in the dialed list and those numbers do not have to be added to the approved list to be later connected. The user has the option of disabling the ability to automatically dial without requiring the DNBS code so that a one time user-approval of a single call does not lead to later abuse (multiple calls to the same number) by a borrower of the cellular phone. One method provided by the invention to prevent such later abuse involves time-limiting the dialed number list so that a number placed on the list only remains on the list for a preset amount of time (e.g. 3 days). Alternatively, the list may be maintained as a FIFO buffer that is N numbers long, so that a number scrolls off the list after N calls placed to different numbers are made.

As described above, the cell phone is programmed/designed to maintain a list of previous numbers dialed in addition to the owner's/subscriber's personal telephone directory. During initial set up of the phone, the set up procedure requires (or prompts) the owner/subscriber to establish a security code, and the security code remains in persistent storage within the phone. The owner is also prompted to select a security setting that includes when to challenge a user for entry of the DNBS code, and the owner selects from among:

(1) challenge the user when a number is being dialed that is not in the list of previously dialed numbers;
(2) challenge the user when an area code is being called that is not been previously authorized;
(3) challenge the user when a number that isn't in the user's dialing directory is being called;
(4) challenge the user when a number is being dialed that hasn't previously shown up in the caller ID The user will enter his/her secret code, and the cell phone will log this number into the list of previously dialed numbers; and
(5) challenge the user when a number is being dialed that is on a list of barred numbers.

The above five selections are provided by the dialed number-based security (DNBS) utility, which displays the list of available selection options via the display of the cell phone. The user selections are stored and user input of all numbers is monitored by the DNBS utility. In one embodiment, rather than challenge the user on every unknown number, an additional setting of the DNBS utility only challenges the user if the entered area code is not in the previous list or if the cellular phone has been idle for a user-selected amount of time.

Figure 6:
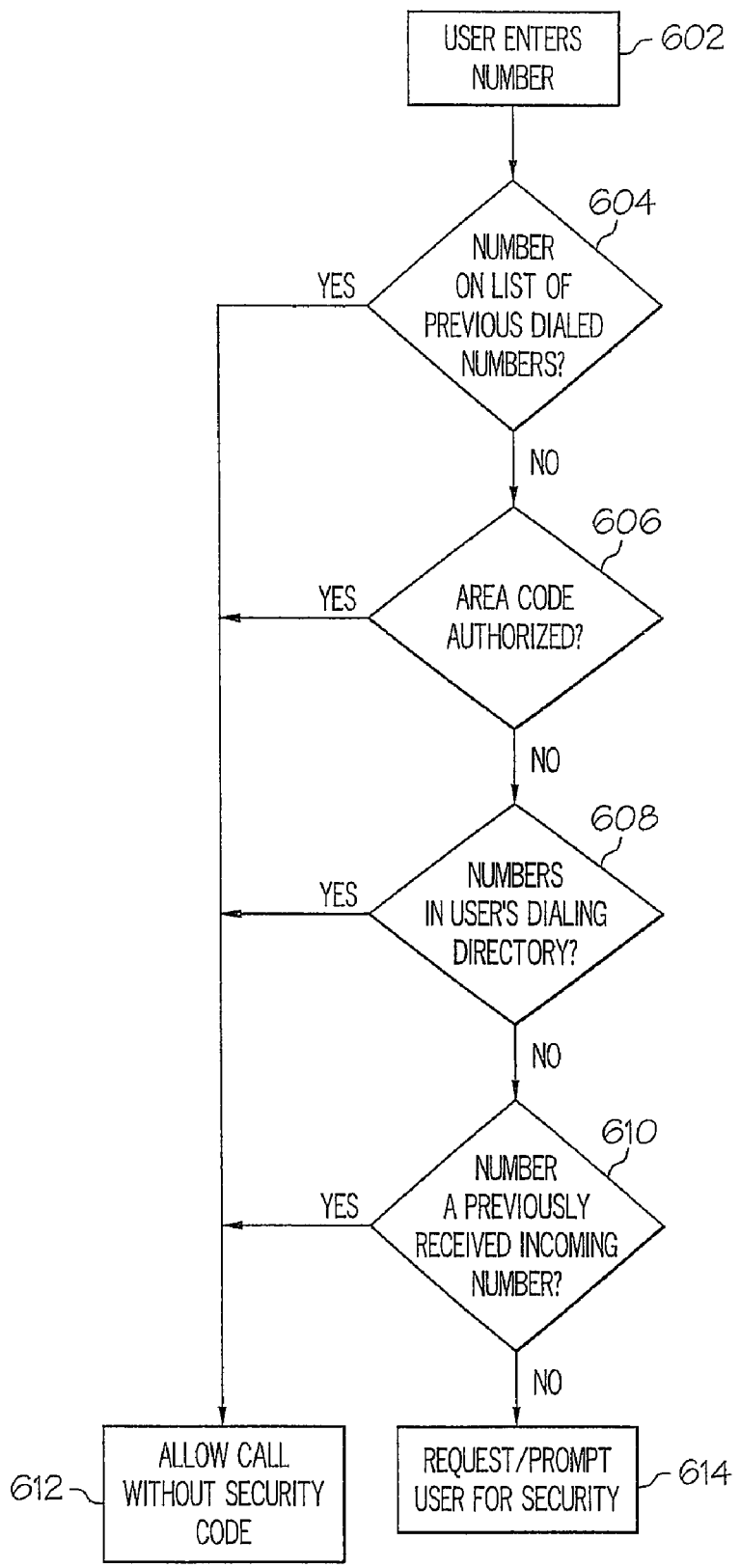
FIG. 6 is a flow chart of the process of searching through all four lists to determine when an entered number requires a security code before the call is completed according to one embodiment of the invention.

In one embodiment, multiple of the above selections are simultaneously activated so that challenges are issued when any one of the multiple activated/monitored conditions is encountered. FIG. 6 illustrates a process flow that incorporates all of the above checks. The process begins at block 602 when a user enters a number to place an outbound call. DNBS utility checks at block 604 whether the entered numbers on the list of previously dialed numbers. If the entered number is not on that list, DNBS utility next checks at block 606 whether the area code of the entered number matches an area code on the approved list of area codes. If the entered number is not on the area code list, DNBS utility then checks at block 608 whether the number is in the user's personal phone directory. If the entered number is not in the user's personal phone directory, DNBS utility finally checks whether the entered number matches a previously received incoming number (that was answered by the user). When any one of these checks provides a positive result, DNBS utility allows the call to proceed without entry of a DNBS code, as stated at block 612. However, if all checks yield a negative result, then DNBS utility prompts the user for the DNBS code, as shown at block 614, and the call is only allowed to complete when the correct DNBS code is entered.

Figure 4A:
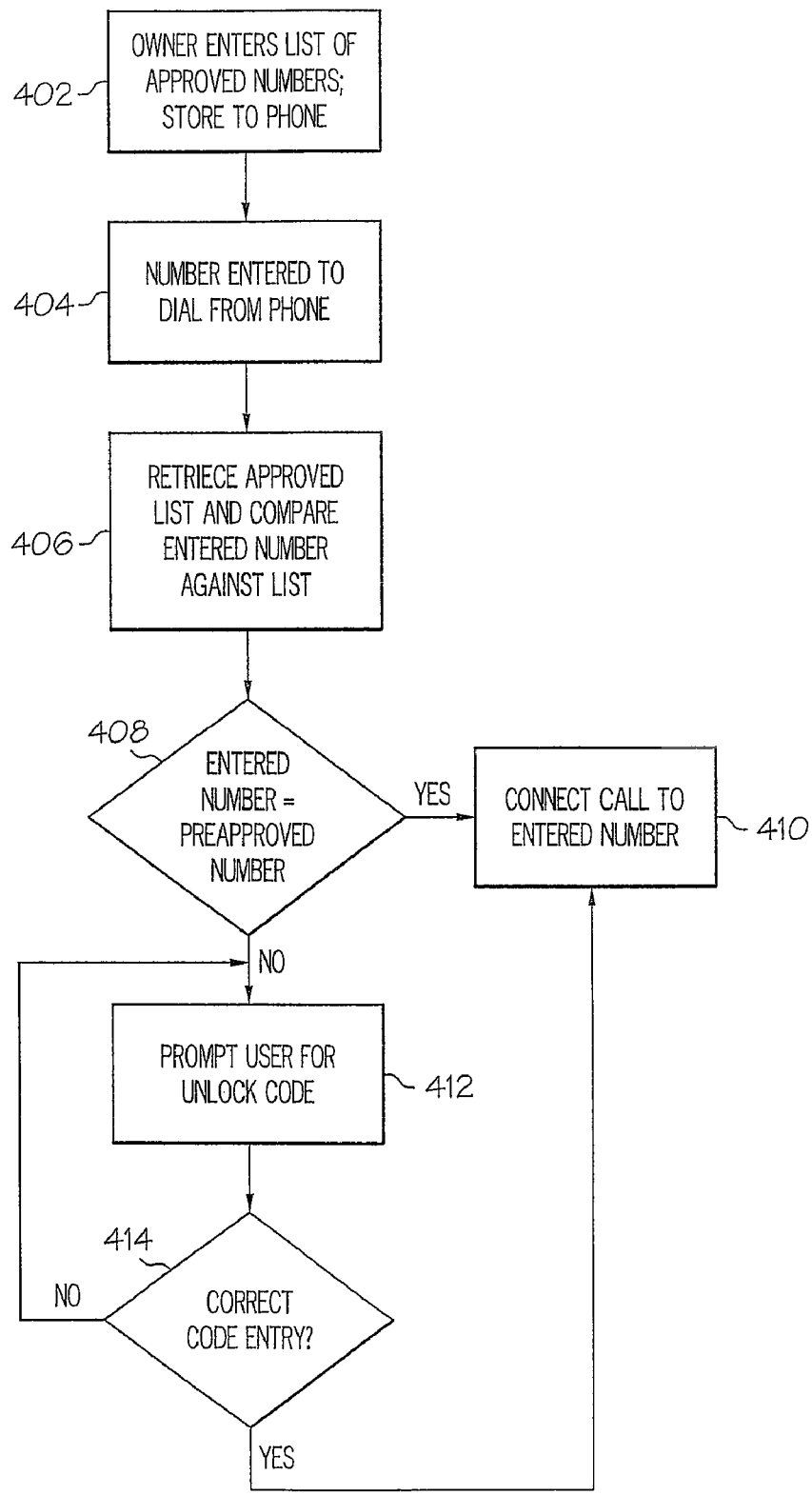
FIGS. 4A and 4B are flow charts illustrating the general process of requiring entry of a security password for an entered number not on the approved/safe list according to two alternate embodiments of the invention.

With reference now to FIG. 4A, there is illustrated a flow chart of the process by which DNBS utility operates to prevent calls being made to unapproved numbers without entry of a pre-established DNBS code. The process begins at block 402 at which the user establishes the DNBS code and enters numbers in the approved list. The phone is set to standard operational mode and allows a user to enter a number to be dialed, as shown at block 404. Once a number is entered and the talk/dial button is pressed/selected, DNBS utility compares the entered number against the various lists of safe/approved numbers, as stated within block 406. Then, DNBS determines, at block 408, whether the entered number is an approved/safe number. If the entered number is on the approved/safe list, the call is connected, as shown at block 410. However, if the entered number is not on the approved/safe list, DNBS utility prompts the user to enter a DNBS code to complete the call, as indicated at block 412. FIG. 1B illustrates an exemplary prompt 121 for DNBS code and entered number 107 on the display 105 of the cellular phone.

At block 414, DNBS utility determines whether the correct code was entered, and the call is connected only if the correct DNBS code is entered. In one embodiment, failure of the user to be able to authenticate the phone (by providing the DNBS code when prompted) locks the entire outgoing functions of the phone. In a related embodiment, a predetermined number of consecutive failures must be recorded before the phone is locked. DNBS utility may display a failure notice to the user indicating that the entered number is not approved for calling form the phone (or the area code is not approved). DNBS utility may also provide additional prompts and/notices as required to provide the user with information and request information from the user.

Figure 4B:
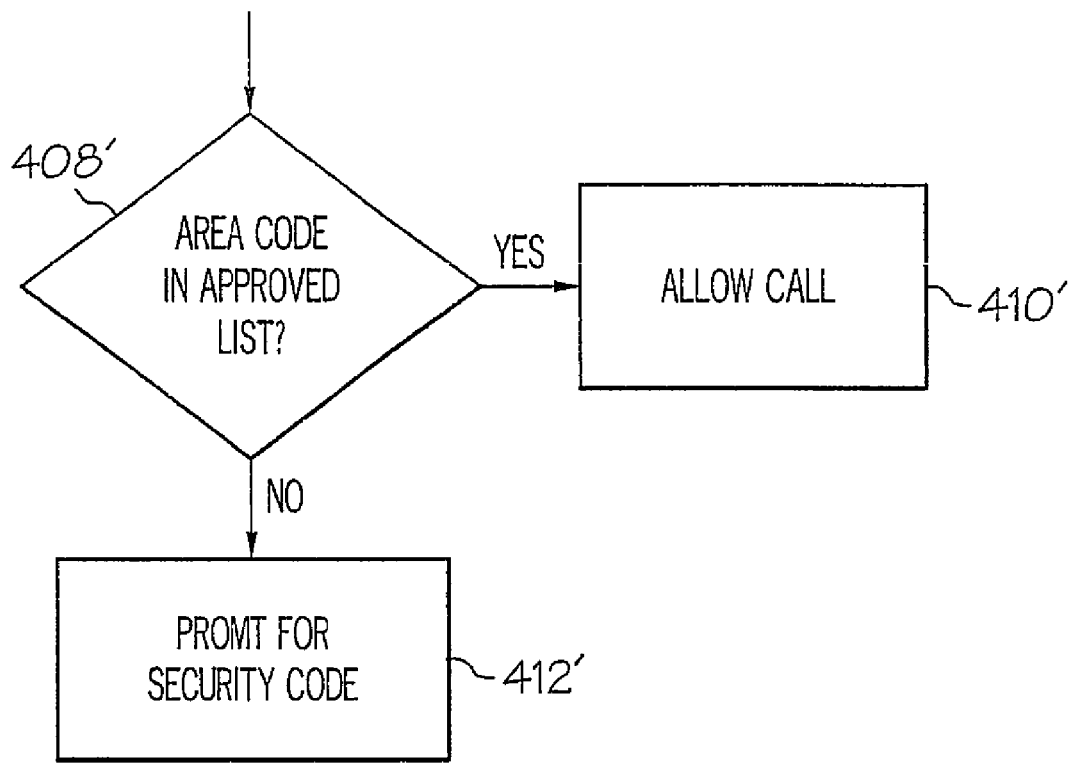

FIG. 4B illustrates an alternate embodiment, in which DNBS utility only checks for the area code, and determines at block 409 if the area code of the entered number matches one of the approved/safe area codes. The process then flows to block 410 or 412 depending on the outcome of the determination. This embodiment is particularly useful when the subscriber has a calling area restricted plan (e.g., calls only to adjacent states identified by specific area codes), where all other calls are charged at a premium.

In addition to the above described embodiments, several different/alternate embodiments of the invention are provided, each supporting one or more of the following features: (1) the user would be able to modify access preferences either on the phone itself, through a software program that manages the phone's local database, or through a secure web portal that would affect preferences stored on a switch or network. (2) The user could specify that access preferences could only be set through one medium, for example the web portal or local software program. (3) The access database could be stored both locally and on a switch or network, and modifications could be pushed to the local database from the server and vice versa. (4) Modifying user preferences would also require an access code. (5) Access preferences could include both to and from points, i.e., allow a particular set of outgoing numbers when calling from specified geographic locations. (6) The user could store preference settings in a profile, and could revert to previously saved security profiles. (7) The user could specify different profiles to use based on current geographic settings, different hours of the day, different days of the week, or different ranges of dates. For example, (a) more permissive security settings might regularly be desired when connecting through a cell tower near the user's home or during hours or days when the user is normally at work and (b) more stringent security settings may be desired when connecting through a foreign cell tower, or on dates when the user is traveling.

The invention thus provides many differences from the conventional applications that attempt to address a similar problem. Among the features that are different from these conventional methods or proposed method are: (1) The database being located locally on the wireless device, for example on a CIM card; (2) The ability for a user to include incoming call numbers in the access database; (3) The ability for the user to set security preferences and profiles. Also, the invention differs from other proposed methods in that the invention is not simply limited to allowing or refusing to connect calls to allowed and unauthorized area codes, respectively. As described herein, the authorized/unauthorized list of the present invention may contain entire numbers rather than just area codes. The invention provides the ability to authorize calls in real time and change security settings by entering a security code. Finally, the invention implements a PIN/password authentication based on specific phone numbers or locations rather than authentication of the user prior to destination entry.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A communication device comprising:
    means for receiving a destination identifier (ID) to which a communication is desired;
    means for comparing the destination ID to one or more lists of approved destination IDs;
    means, when said destination ID matches one of the approved destination IDs, for enabling the communication to the destination ID from the communication device;
    when the destination ID does not match one of the approved destination IDs and is an un-approved destination ID:
        means for enabling completion of each communication from the communication device to each un-approved destination ID only when a pre-established user code that authorizes completion to un-approved destination IDs is received in real time at the time proximate to when a request to initiate the communication is received and prior to enabling completion of the communication, wherein said communication is prevented from completing when the pre-established user code is not received.

2. The communication device of claim 1, wherein said means for enabling completion of the communication to further comprises:
    means for initially preventing completion of the communication from the communication device to that destination ID;
    means for prompting for real-time entry of the pre-established user code; and
    means for enabling communication from the communication device to the entered destination ID only when a code, received in real time, at the time just prior to when the particular communication is initiated to the un-approved destination ID, matches the pre-established user code.

3. The communication device of claim 2, further comprising:
    means for enabling entry of a security code during set up of the communication device;
    means for storing the security code as a pre-established user code in persistent storage; and
    means for retrieving the pre-established user code and comparing the pre-established user code to a subsequent code entered by the user, wherein said means for enabling includes means for comparing the subsequent code to the pre-established user code.

4. The communication device of claim 1, further comprising:
    a wireless communication circuit that enables transmission of wireless communication from the communication device to a terminating device associated with the entered destination ID; and
    wherein the communication is a wireless communication and the destination ID is one of a number to a phone device or an address of a network device, accessible from the communication device; and
    wherein a real-time override password is required to be entered each time a particular outgoing call is initiated to an un-approved phone number.

5. The communication device of claim 1, wherein the communication device is a wireless cellular phone and the destination ID includes an area code of a telephone number, wherein specific ones of available area codes correspond to the approved destination IDs to which calls may be made and calls made to those specific area codes are completed while calls made to area codes that do not match one of the specific area codes are not completed without user entry of the pre-established user code.

6. The communication device of claim 1, further comprising:
means for generating a user directory within which a user enters destination IDs;
means for providing an approved list of approved destination IDs;
means for recording destination IDs of previous communications, said destination IDs being recorded within a list of recently utilized destination IDs; and
means for creating a list of un-approved destination IDs corresponding to destinations for which entry of the pre-established user code is required.

7. The communication device of claim 1, further comprising:
means for prompting a user to store a destination ID and received call ID for a recently completed communication to a list of recently communicated IDs, which list provides recently approved destination IDs that do not require a code for a subsequent communication to destination IDs on the list; and
means, responsive to the user selecting an option to store the destination ID or received call ID, for updating the list of recently communicated IDs to include the destination ID or received call ID such that subsequent calls to that destination ID and calls to the received call ID, which are not previously included within the list, are subsequently completed without requiring user entry of the code.

8. The communication device of claim 1, further comprising:
means for limiting a requirement for entry of the pre-established user code by geographical parameters, wherein a first set of destination IDs are automatically restricted from being available for termination of a communication from the communication device when the communication device is in a first geographical location, such that the pre-established code is required to complete a call from the first geographical location, while communication to the first set of destination IDs is automatically allowed when in another pre-defined geographical location.

9. The communication device of claim 1, further comprising:
means for limiting a requirement for entry of the pre-established user code by time-of-day and date-specific parameters, wherein a specific destination ID is automatically restricted from being available for termination of a communication from the communication device when the present time of day or date is one of a preset time or date in which the communication device is restricted from completing a call to that specific destination ID, such that the pre-established code is required to complete a call during the present time of data or date, while communication to the specific destination IDs is automatically allowed during another time or date.

10. The communication device of claim 1, wherein the communication device is a wireless cell phone and the destination ID is a telephone number.

11. A computer program product comprising:
a computer readable medium; and
program code on the computer readable medium for:
receiving a destination identifier (ID) to which a communication is desired;
comparing the destination ID to one or more approved destination IDs;
when said destination ID matches one of the approved destination IDs, enabling the communication to the destination ID from a communication device; and
when the destination ID does not match one of the approved destination IDs:
preventing completion of the communication from a communication device to that destination ID;
prompting a user for entry of a pre-established user code; and
enabling communication from the communication device to the entered destination ID when a code entered by the user in real time matches the pre-established user code;
wherein each communication from the communication device to each destination ID that is not approved is completed only when a pre-established user code that authorizes completion to un-approved destination IDs is received in real time, at a time proximate to when each request to initiate the communication is received and prior to enabling each completion of the communication, wherein said communication is prevented from completing when the pre-established user code is not received.

12. The computer program product of claim 11, further comprising program code for:
generating a user directory within which a user enters destination IDs;
providing an approved list of approved destination IDs, wherein when the communication device is a wireless cellular phone and the destination ID includes an area code of a telephone number, and wherein, when specific ones of available area codes correspond to the approved destination IDs to which calls may be made, calls made to those specific area codes are completed while calls made to area codes that do not match one of the specific area codes are not completed without user entry of the pre-established user code;
recording destination IDs to which previous communications are received or transmitted, said destination IDs being recorded within a list of recently utilized destination IDs;
establishing a list of un-approved destination IDs corresponding to destinations for which entry of the pre-established user code is required;
prompting a user to store a destination ID and received call ID for a recently completed communication to a list of recently communicated IDs, which list provides recently approved destination IDs that do not require a code for a subsequent communication to destination IDs on the list; and
responsive to the user selecting an option to store the destination ID or received call ID, updating the list of recently communicated IDs to include the destination ID or received call ID such that subsequent calls to that destination ID and calls to the received call ID are completed without requiring user entry of the code;
wherein a real-time override password is required to be entered each time a particular outgoing communication is initiated to an un-approved communication ID not within the list.

* * * * *